United States Patent
Conley et al.

(10) Patent No.: US 11,588,778 B2
(45) Date of Patent: Feb. 21, 2023

(54) SYSTEM AND METHOD FOR ENHANCED SECOND SCREEN EXPERIENCE

(71) Applicant: Fox Sports Productions, LLC, Los Angeles, CA (US)

(72) Inventors: Michael P. Conley, The Woodlands, TX (US); Brian Rogers, Santa Monica, CA (US)

(73) Assignee: FOX SPORTS PRODUCTIONS, LLC, Los Angeles, CA (US)

( * ) Notice: Subject to any disclaimer, the term of this patent is extended or adjusted under 35 U.S.C. 154(b) by 1669 days.

(21) Appl. No.: 14/388,994

(22) PCT Filed: Mar. 29, 2013

(86) PCT No.: PCT/US2013/034557
§ 371 (c)(1),
(2) Date: Sep. 29, 2014

(87) PCT Pub. No.: WO2013/149120
PCT Pub. Date: Oct. 3, 2013

(65) Prior Publication Data
US 2015/0074560 A1    Mar. 12, 2015

Related U.S. Application Data

(60) Provisional application No. 61/617,732, filed on Mar. 30, 2012.

(51) Int. Cl.
*H04L 51/52*     (2022.01)
*G06Q 50/00*     (2012.01)
(Continued)

(52) U.S. Cl.
CPC ............ *H04L 51/32* (2013.01); *G06F 3/0484* (2013.01); *G06F 3/1423* (2013.01); *G06Q 30/02* (2013.01); *G06Q 50/01* (2013.01); *H04L 51/046* (2013.01)

(58) Field of Classification Search
CPC ...................................................... H04L 51/32
See application file for complete search history.

(56) References Cited

U.S. PATENT DOCUMENTS 8,091,111 B2 * 1/2012 Logan .............. H04N 21/44222
725/110
8,516,374 B2 * 8/2013 Fleischman ............. G06F 3/048
715/716

(Continued)

FOREIGN PATENT DOCUMENTS

KR    2000072677 A    12/2000
KR    2001077417 A    8/2001
(Continued)

OTHER PUBLICATIONS

International Application No. PCT/US2013/034557 International Search Report and Written Opinion dated Jul. 7, 2013, 11 pages.

*Primary Examiner* — William L Bashore
*Assistant Examiner* — Nathan K Shrewsbury
(74) *Attorney, Agent, or Firm* — Cantor Colburn LLP

(57) ABSTRACT

A system and method for providing an enhanced second screen experience is provided includes a content-rich second screen user interface with information relative to an event and event participants as well as social media aspects relative to the event and event participants.

28 Claims, 3 Drawing Sheets

(51) Int. Cl.
*G06Q 30/02* (2023.01)
*G06F 3/0484* (2013.01)
*G06F 3/14* (2006.01)
*H04L 51/046* (2022.01)

(56) References Cited

U.S. PATENT DOCUMENTS

| | | | | |
|---|---|---|---|---|
| 8,543,454 | B2* | 9/2013 | Fleischman | H04N 21/23418 |
| | | | | 705/14.44 |
| 8,738,697 | B2* | 5/2014 | Park | H04L 51/12 |
| | | | | 709/204 |
| 8,817,065 | B1* | 8/2014 | Mo | H04N 7/147 |
| | | | | 348/14.08 |
| 8,888,584 | B2* | 11/2014 | Cohen | A63F 13/828 |
| | | | | 463/25 |
| 9,053,517 | B2* | 6/2015 | Stanton | G06Q 10/10 |
| 9,420,315 | B2* | 8/2016 | Melanson | H04N 21/25841 |
| 9,440,152 | B2* | 9/2016 | Thompson | A63F 13/35 |
| 9,509,732 | B2* | 11/2016 | Asver | G06Q 10/10 |
| 2005/0076362 | A1* | 4/2005 | Dukes | H04L 29/06 |
| | | | | 725/46 |
| 2009/0022165 | A1* | 1/2009 | Candelore | H04L 12/28 |
| | | | | 370/400 |
| 2009/0156311 | A1 | 6/2009 | Ng et al. | |
| 2009/0187514 | A1* | 7/2009 | Hannan | G06F 17/30654 |
| | | | | 706/11 |
| 2009/0293079 | A1* | 11/2009 | McKee | H04L 51/32 |
| | | | | 725/10 |
| 2009/0300502 | A1* | 12/2009 | Johnson | G06Q 10/00 |
| | | | | 715/733 |
| 2010/0208082 | A1* | 8/2010 | Buchner | H04N 21/4316 |
| | | | | 348/207.1 |
| 2010/0211465 | A1* | 8/2010 | Hughes | A63F 13/00 |
| | | | | 705/14.53 |
| 2011/0072461 | A1* | 3/2011 | Moon | H04N 21/4316 |
| | | | | 725/40 |
| 2011/0103763 | A1* | 5/2011 | Tse | H04N 21/47815 |
| | | | | 386/201 |
| 2011/0138416 | A1* | 6/2011 | Kang | H04N 21/42208 |
| | | | | 725/39 |
| 2011/0154223 | A1 | 6/2011 | Whitnah et al. | |
| 2011/0225519 | A1* | 9/2011 | Goldman | G06F 3/0481 |
| | | | | 715/757 |
| 2012/0004956 | A1* | 1/2012 | Huston | G06Q 30/0207 |
| | | | | 705/14.1 |
| 2012/0036537 | A1* | 2/2012 | Klappert | H04N 21/47214 |
| | | | | 725/50 |
| 2012/0215903 | A1* | 8/2012 | Fleischman | G06Q 30/0201 |
| | | | | 709/224 |
| 2012/0233011 | A1* | 9/2012 | Barlow | G06Q 30/08 |
| | | | | 705/26.3 |
| 2012/0320013 | A1* | 12/2012 | Perez | H04N 21/632 |
| | | | | 345/207 |
| 2013/0007042 | A1* | 1/2013 | Klappert | G06F 16/583 |
| | | | | 707/769 |
| 2013/0014031 | A1* | 1/2013 | Whitnah | G06Q 10/10 |
| | | | | 715/753 |
| 2013/0073389 | A1* | 3/2013 | Heath | G06Q 30/02 |
| | | | | 705/14.54 |
| 2013/0079073 | A1* | 3/2013 | Sharifi | A63F 13/812 |
| | | | | 463/3 |
| 2013/0151603 | A1* | 6/2013 | Lobb | G06Q 50/01 |
| | | | | 709/204 |
| 2013/0268962 | A1* | 10/2013 | Snider | H04N 21/4307 |
| | | | | 725/32 |
| 2013/0304820 | A1* | 11/2013 | Vasquez | H04W 4/21 |
| | | | | 709/204 |
| 2013/0324247 | A1* | 12/2013 | Esaki | H04N 21/472 |
| | | | | 463/31 |
| 2014/0121013 | A1* | 5/2014 | Carson | A63F 13/828 |
| | | | | 463/31 |
| 2014/0243094 | A1* | 8/2014 | Tayloe | G06Q 30/02 |
| | | | | 463/42 |
| 2014/0280537 | A1* | 9/2014 | Pridmore | G06F 16/24575 |
| | | | | 709/204 |
| 2014/0282677 | A1* | 9/2014 | Mantell | H04N 21/4784 |
| | | | | 725/23 |
| 2015/0058324 | A1* | 2/2015 | Kauwe | G06F 16/284 |
| | | | | 707/722 |
| 2015/0358680 | A1* | 12/2015 | Feldstein | H04N 21/478 |
| | | | | 725/43 |
| 2015/0382076 | A1* | 12/2015 | Davisson | H04N 21/435 |
| | | | | 725/62 |

FOREIGN PATENT DOCUMENTS

KR  678743 B1  2/2007
KR  2012025812 A  3/2012

* cited by examiner

42

SYSTEM AND METHOD FOR ENHANCED SECOND SCREEN EXPERIENCE

TECHNICAL FIELD

This invention relates generally to a system and method for an enhanced second screen experience. More particularly, this invention relates to methods and systems that integrates social media aspects into a second screen system in parallel with or relative to an event.

BACKGROUND OF THE INVENTION

Generally, during or relative to an event, such as a sporting event, if a person desires additional information about the event or players in an event, the user would utilize a laptop or other device along with a search engine to find the desired information. Further, if that person wishes to reach out to a second person, e.g. to talk about a particular play, to talk about statistics, etc., the person would have to directly reach out to that person via email, personal message, etc.

There is a need in the art for an improved system and method for providing a second screen event that provides comprehensive information about an event and also integrates social media aspects into the second screen system in parallel with or relative to the event.

SUMMARY

The above described and other problems and disadvantages of the prior art are overcome and alleviated by the present system and method for providing a second screen experience relative to an event. In exemplary embodiments, the second screen experience provides information on plural levels of granularity relative to the event, e.g., sporting team statistics, game or event status, player status and statistics, interactive content, such as mouse rollovers of bases during a baseball event to reveal information about a player at that base.

Further exemplary embodiments also provide social media aspects within the second screen experience. In one exemplary embodiment, an individual player panel may expand when a player's name or other identifier is selected from a list (such as a list of baseball players on bat) to reveal further information about the player and/or to provide a social media thread specific to that player. Additional exemplary embodiments may change the shape or indicator of a player's name or other identifier according to the level of social activity relative to that player (i.e., social buzz).

Other exemplary embodiments provide further interactivity with others by providing a communications board, e.g., configured to allow users to send and receive answers to questions from a sporting booth, panel or expert.

The above discussed and other features and advantages of the present invention will be appreciated and understood by those skilled in the art from the following detailed description and drawings.

BRIEF DESCRIPTION OF THE DRAWINGS

Referring to the exemplary drawings wherein like elements are numbered alike in the several FIGURES.

DETAILED DESCRIPTION

Figure 1:
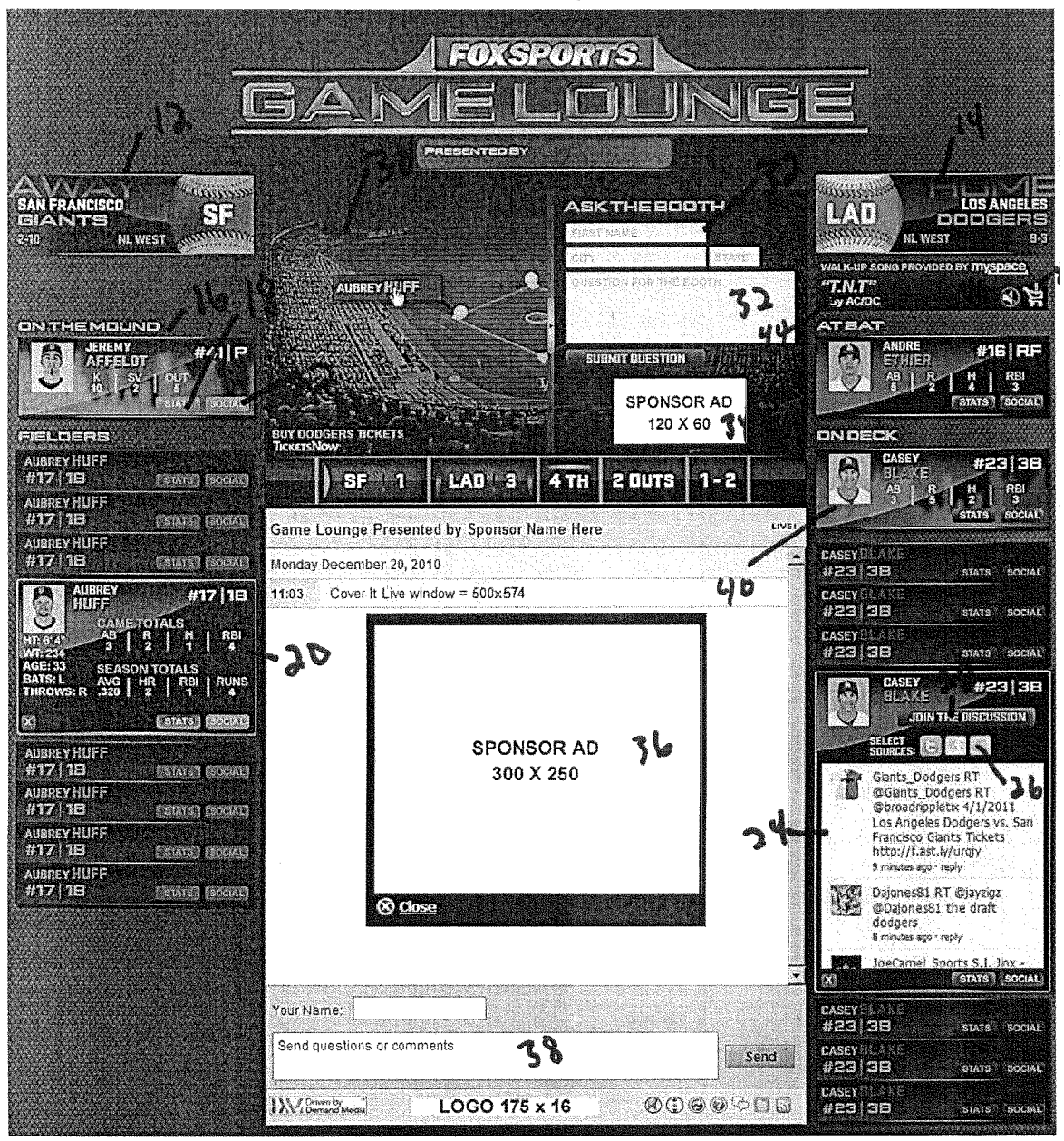
FIG. 1 illustrates an exemplary user interface for a second screen experience incorporating social media aspects.

Detailed illustrative embodiments are disclosed herein. However, specific functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be further understood that, although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" includes any and all combinations of one or more of the associated listed items.

As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It will also be understood that the terms "photo," "photograph," "image," or any variation thereof may be interchangeable. Thus, any form of graphical image may be applicable to example embodiments.

It will also be understood that the terms "audio," "audio tracks," "music," "music tracks," or any variation thereof may be interchangeable. Thus any form of audio may be applicable to example embodiments.

It will also be understood that the terms "media," "multimedia," "video," or any variation thereof may be interchangeable. Thus any form of rich media may be applicable to example embodiments.

It will also be understood that the terms "statistics," "measurements," "analytics," "calculations," or other similar terms may be used to describe example forms of the associated definitions as understood by one of ordinary skill in the art, although other similar acts/functions may be applicable depending upon any particular form of an example embodiment. For example, a statistical calculation may include analytical calculations, and vice versa. Furthermore, measurements may include calculations upon, during, subsequent, or in addition to measurements or any act of retrieving data.

It should also be understood that other terms used herein may be applicable based upon any associated definition as understood by one of ordinary skill in the art, although other meanings may be applicable depending upon the particular context in which terms are used.

Therefore, the terminology used herein is for the purpose of describing particular embodiments only and is not intended to be limiting of example embodiments. It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Further to the brief description provided above and associated textual detail of each of the figures, the following description provides additional details of example embodiments of the present invention.

As described herein, example embodiments of the present invention may include methods and systems for providing a second screen experience relative to an event. In exemplary embodiments, the second screen experience provides information on plural levels of granularity relative to the event, e.g., sporting team statistics, game or event status, player status and statistics, interactive content, such as mouse rollovers of bases during a baseball event to reveal information about a player at that base.

Further exemplary embodiments also provide social media aspects within the second screen experience. In one exemplary embodiment, an individual player panel may expand when a player's name or other identifier is selected from a list (such as a list of baseball players on bat) to reveal further information about the player and/or to provide a social media thread specific to that player. Additional exemplary embodiments may change the shape or indicator of a player's name or other identifier according to the level of social activity relative to that player (i.e., social buzz).

Other exemplary embodiments provide further interactivity with others by providing a communications board, e.g., configured to allow users to send and receive answers to questions from a sporting booth, panel or expert.

Some or all of the above and the additional below-described features advantageously provide a media and information-rich second screen experience for a user that additionally provides social media aspects in parallel with or relative to an event, e.g., a sporting event. Prior to this invention, so such system existed to not only gain a content-rich second screen experience, but also to socially interact with other people relative to that content.

Hereinafter, example embodiments of the present invention are described in detail.

Turning to FIG. 1, an exemplary user interface is provided generally at 10 as a second screen experience with social media aspects. While this particular exemplary embodiment is provided for a baseball game, other events are included within the scope of the present invention.

Referring again to FIG. 1, respective team headers and statistics are provided at 12 (first team) and 14 (second team). In this exemplary embodiment, the first team is in the field and the second team is at bat. At 16, an exemplary indication shows what player is currently pitching and provides abbreviated statistics and other information on the pitcher. A first button 18, labeled "STATS", is configured to supply additional statistics relative to a player. Item 20 illustrates an example of a popup window showing additional statistics.

An additional button 22, labeled "SOCIAL", is configured to supply a social media thread specific to the selected player. Item 24 is an example of a popup window showing a social media thread specific to a selected player. This exemplary window further allows selection between plural social media sources at 26 and a button 28 that permits the user to join in the social media discussion. The feed may present as content from a single source, or as an aggregate of all or selected sources. Also, in exemplary embodiments, selection of a button referring to joining a discussion, or selection of social media sources allows a user to log into that social media source(s) or automatically logs a user into the social media source(s).

Still referring to the exemplary interface of FIG. 1, the columns for each team show selectable listings of players according to position or sequence (in this case sequence at bat). Additional information about a player may be triggered either by selecting the player's name, icon, button (including the "STATS" or "SOCIAL" buttons), or by an interactive interface 30, that permits mouse rollover of positions on a field to reveal players or allow expansion of player information.

An additional exemplary interface 32 provides a user with the ability to ask a question from a sports booth, expert or other individual. This interface 32 is shown expanded over the interactive interface 30. After submission of the question, the interface is configured to retract away from the interactive interface 30.

Sponsor ads 34 and 36 are configured to provide advertisement opportunities in the second screen space. Additionally, sponsor ad 36 is positioned in a window that also allows a user to submit questions to a sponsor via a query interface 38.

Figure 2:
FIG. 2 illustrates an exemplary image gallery showing changes in image proportions for players according to social buzz.

Referring still to FIG. 1, a player's name, icon or other representative indicia can change state or appearance depending on the level of social activity associated with that player (social buzz). In the example at 40, a colored visual is provided as a color sound wave due to the social activity regarding that player. Further, and with regard to FIG. 2, an exemplary player image grid may be provided, shown generally at 42, wherein players having more social activity have larger images than players having less social activity.

Additional rich content, such as media, may also be provided at or posted to the second screen experience. The exemplary "WALK-UP SONG" at 44 is an example of such media. Additional icons may be provided, as in this case, to affect volume (46) or to purchase media (48), among others.

Figure 3:
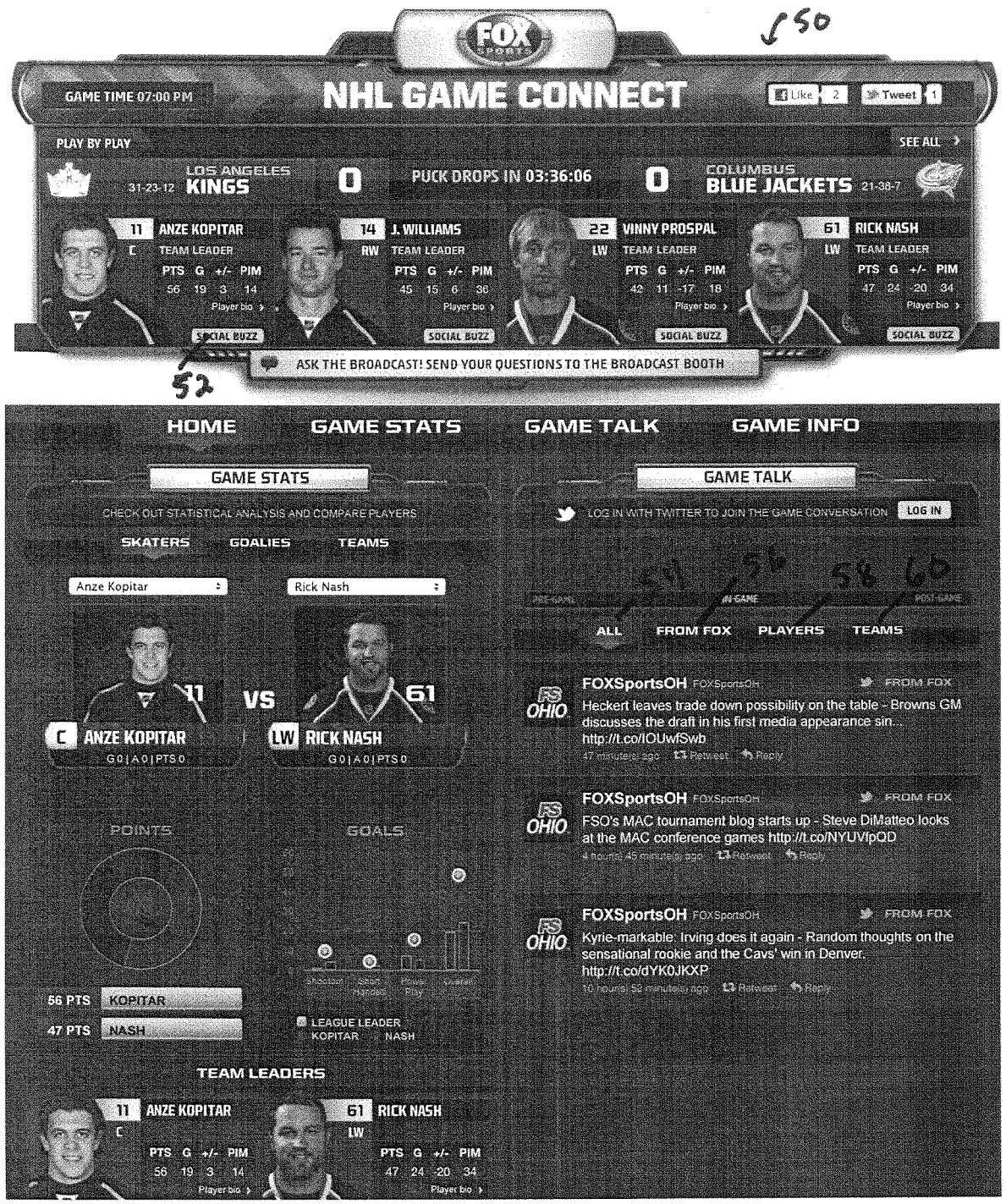
FIG. 3 is another exemplary user interface for a second screen experience incorporating social media aspects.

FIG. 3 provides another exemplary second screen experience generally at 50. In this exemplary embodiment, player icons and details are similarly listed in a manner appropriate to the sport. In relevant part, the button 52, labeled "SOCIAL BUZZ", will flip a player card over to reveal social media relevant to a particular player. Also, social media threads are sortable by "ALL" (54), "FROM FOX" (the broadcaster, 56), "PLAYERS (58) and "TEAMS" (60).

The information within the second screen experience, inclusive of social media content, can be updated periodically, or in real time. Additionally, the system may track a user's activity periodically or in real time to generate information about a user that may be used generally for metrics, to determine preferred content, or to target advertising to the user, among others.

Examples of user activities may include clicking through an advertisement, accessing a social network and posting real user activities (e.g., status updates, events, etc) and comments. Furthermore, user activities may include clicking, accessing, or sharing content already uploaded to the website. Additionally, a user may click a shared web-link, URL, or other dynamic content previously posted, and thus these activities may also be tracked. It is also noted that the activities described above are only examples of possible activities to be tracked, and should not be construed as limiting.

It is further noted that embodiments of the invention may be embodied in the form of computer-implemented processes and apparatuses for practicing those processes. Therefore, according to an exemplary embodiment, the methodologies described hereinbefore may be implemented by a computer system or apparatus. Therefore, portions or the entirety of the methodologies described herein may be executed as instructions in a processor of the computer system. The computer system includes memory for storage of instructions and information, input device(s) for computer communication, and display device. Thus, the present invention may be implemented, in software, for example, as any suitable computer program on a computer system somewhat similar to computer system. For example, a program in accordance with the present invention may be a computer program product causing a computer to execute the example methods described herein.

Therefore, embodiments can be embodied in the form of computer-implemented processes and apparatuses for practicing those processes on a computer program product. Embodiments include the computer program product on a computer usable medium with computer program code logic containing instructions embodied in tangible media as an article of manufacture. Exemplary articles of manufacture for computer usable medium may include floppy diskettes, CD-ROMs, hard drives, universal serial bus (USB) flash drives, or any other computer-readable storage medium, wherein, when the computer program code logic is loaded into and executed by a computer, the computer becomes an apparatus for practicing the invention. Embodiments include computer program code logic, for example, whether stored in a storage medium, loaded into and/or executed by a computer, or transmitted over some transmission medium, such as over electrical wiring or cabling, through fiber optics, or via electromagnetic radiation, wherein, when the computer program code logic is loaded into and executed by a computer, the computer becomes an apparatus for practicing the invention. When implemented on a general-purpose microprocessor, the computer program code logic segments configure the microprocessor to create specific logic circuits.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider.

It should be emphasized that the above-described example embodiments of the present invention, including the best mode, and any detailed discussion of particular examples, are merely possible examples of implementations of example embodiments, and are set forth for a clear understanding of the principles of the invention. Many variations and modifications may be made to the above-described embodiment(s) of the invention without departing from the spirit and scope of the invention. All such modifications and variations are intended to be included herein within the scope of this disclosure and the present invention and protected by the following claims.

What is claimed is:

1. A computer-implemented method for providing an enhanced second screen experience, comprising:
   providing a user interface, the user interface configured to present to a user a plurality of data elements relative to an event and participants in said event; and
   providing a plurality of selectable social media interfaces separately specific to different data elements within said plurality of data elements, said plurality of selectable social media interfaces including a social media thread within or overlaid on said user interface, the social media thread being specific to the event or to participants in the event, the social media interface being configured receive or initiate a social media comment entered by said user and to display social media comments posted by plural users.

2. A computer-implemented method in accordance with claim 1, wherein the second screen experience is provided in temporal parallel with the event.

3. A computer-implemented method in accordance with claim 1, wherein the second screen experience provides information on plural levels of granularity relative to the event, including two or more of game or event status, team status or statistics, and player status or statistics.

4. A computer-implemented method in accordance with claim 1, wherein the user interface includes interactive content configured such that user interaction with the content reveals additional information about the event or the event participants.

5. A computer-implemented method in accordance with claim 1, wherein a listing of an individual participant is configured to expand when a participant's name or other identifier is selected from a list to reveal further information about the player.

6. A computer-implemented method in accordance with claim 1, wherein a listing of an individual participant is configured to expand when a participant's name or other identifier is selected from a list to provide a social media thread specific to that participant.

7. A computer-implemented method in accordance with claim 1, wherein a shape or indicator of a participant's name or other identifier changes according to the level of social activity relative to that participant.

8. A computer-implemented method in accordance with claim 1, wherein a communications interface is provided and configured to allow users to send and receive answers to questions from an event expert.

9. A computer-implemented method in accordance with claim 1, wherein the social media interface displays an aggregate of thread comments from plural social media sources.

10. A computer-implemented method in accordance with claim 9, wherein said social media interface is configured to permit selection of one or more social media sources for thread display.

11. A computer-implemented method in accordance with claim 1, wherein the social media interface is configured to initiate user login to one or more social media sources.

12. A computer-implemented method in accordance with claim 11, wherein said social media interface is configured to automatically log a user into one or more social media sources.

13. A computer-implemented method in accordance with claim 1, further comprising presentation of media coinciding with an action in an event.

14. A computer-implemented method in accordance with claim 13, wherein such presentation of media is accompanied with a purchase command or icon, configured to allow a user to purchase the presented media.

15. A system for providing an enhanced second screen experience, comprising:
   a user interface, the user interface configured to present to a user plural data elements relative to an event and participants in said event; and
   a social media interface including a social media thread for each of said plural data elements within or overlaid on said user interface, the social media thread being specific to the event or to participants in the event represented by a data element, the social media interface being configured receive or initiate a social media comment entered by said user and to display social media comments posted by plural users.

16. A system in accordance with claim 15, wherein the second screen experience is provided in temporal parallel with the event.

17. A system in accordance with claim 15, wherein the second screen experience provides information on plural levels of granularity relative to the event, including two or more of game or event status, team status or statistics, and player status or statistics.

18. A system in accordance with claim 15, wherein the user interface includes interactive content configured such that user interaction with the content reveals additional information about the event or the event participants.

19. A system in accordance with claim 15, wherein a listing of an individual participant is configured to expand when a participant's name or other identifier is selected from a list to reveal further information about the player.

20. A system in accordance with claim 15, wherein a listing of an individual participant is configured to expand when a participant's name or other identifier is selected from a list to provide a social media thread specific to that participant.

21. A system in accordance with claim 15, wherein a shape or indicator of a participant's name or other identifier changes according to the level of social activity relative to that participant.

22. A system in accordance with claim 15, wherein a communications interface is provided and configured to allow users to send and receive answers to questions from an event expert.

23. A system in accordance with claim 15, wherein the social media interface displays an aggregate of thread comments from plural social media sources.

24. A system in accordance with claim 23, wherein said social media interface is configured to permit selection of one or more social media sources for thread display.

25. A system in accordance with claim 15, wherein the social media interface is configured to initiate user login to one or more social media sources.

26. A system in accordance with claim 25, wherein said social media interface is configured to automatically log a user into one or more social media sources.

27. A system in accordance with claim 15, further comprising presentation of media coinciding with an action in an event.

28. A system in accordance with claim 27, wherein such presentation of media is accompanied with a purchase command or icon, configured to allow a user to purchase the presented media.

* * * * *